United States Patent
Paternostro

(10) Patent No.: US 8,485,856 B2
(45) Date of Patent: Jul. 16, 2013

(54) DECOY ANCHOR ASSEMBLY

(76) Inventor: Carlo Paternostro, Baker, LA (US)

( * ) Notice: Subject to any disclaimer, the term of this patent is extended or adjusted under 35 U.S.C. 154(b) by 234 days.

(21) Appl. No.: 12/925,823

(22) Filed: Oct. 28, 2010

(65) Prior Publication Data

US 2012/0102810 A1  May 3, 2012

(51) Int. Cl.
*A01M 31/06* (2006.01)
*B63B 22/16* (2006.01)
*B63B 21/24* (2006.01)

(52) U.S. Cl.
USPC .................... 441/6; 114/293; 114/294; 43/3

(58) Field of Classification Search
USPC ............... 114/293, 294, 210, 230.23; 441/6, 441/21, 23–29; 43/1, 2, 3; 119/796
See application file for complete search history.

(56) References Cited

U.S. PATENT DOCUMENTS

| | | | |
|---|---|---|---|
| 1,901,050 A | 3/1933 | Voorhees | |
| 2,289,647 A | 7/1942 | Grossenbach | |
| 2,520,233 A | 8/1950 | Buehl | |
| 2,630,093 A | 3/1953 | Toal | |
| 2,678,778 A * | 5/1954 | Gibson | 242/405.1 |
| 2,722,018 A | 11/1955 | Mueller | |
| 2,776,644 A | 1/1957 | Fontaine | |
| 3,050,895 A | 8/1962 | Bratland et al. | |
| 3,056,978 A * | 10/1962 | Bradley | 441/8 |
| 3,626,528 A | 12/1971 | Jackson | |
| 3,693,596 A | 9/1972 | Croce et al. | |
| 5,974,720 A * | 11/1999 | Bowling | 43/3 |
| 6,543,176 B1 | 4/2003 | McGhghy | |
| 6,760,993 B2 | 7/2004 | Lebens | |
| 6,857,383 B2 * | 2/2005 | Sarantidis | 114/304 |
| 6,877,267 B2 | 4/2005 | Burton | |
| 7,178,754 B2 * | 2/2007 | Anderson | 242/402 |
| 7,493,873 B2 * | 2/2009 | Petersen | 119/789 |
| 2007/0056527 A1 | 3/2007 | Sparks et al. | |
| 2011/0067649 A1 * | 3/2011 | O'Brien et al. | 119/796 |

* cited by examiner

*Primary Examiner* — Stephen Avila
*Assistant Examiner* — Andrew Polay
(74) *Attorney, Agent, or Firm* — Keaty Law Firm

(57) ABSTRACT

An anchor for use with a buoyant decoy used in hunting has a hollow anchor housing configured for detachable engagement with the buoyant decoy, the hollow housing having an anchor head portion, a ballasted and ballastible anchor shaft portion and a hook portion unitary connected to the anchor shaft portion. A reel assembly with a spool of an anchor line is positioned in the anchor housing. The spool is rotated by a detachable crank handle to rewind the anchor line into the housing. A spring-operated release plunger is positioned within a bore formed in the head portion. When the plunger is depressed, the anchor line can be extended and/or retrieved. A hook on a free end of the anchor line allows detachable securing of the anchor housing to the keel of the decoy.

13 Claims, 5 Drawing Sheets

DECOY ANCHOR ASSEMBLY

BACKGROUND OF THE INVENTION

This invention relates to bird hunting, and more particularly to an anchor assembly for use with a waterfowl decoy for bird hunting.

Decoys are often used by bird hunters to attract or lure the waterfowl within shooting range. Such decoys are most often deployed in a body of water in a location most likely to attract ducks and such. Often times the decoys have the appearance of a waterfowl; they are held in place by an anchor that keeps the decoys in place in the water. Decoys can be anchored by tying a string to them and providing a small weight at the end of the string.

More elaborate decoys are provided with a reel for holding the string, with the reel positioned in the body of the decoy. A cutout is made in the body of the decoy and the reel is positioned in the open cavity. A weighted anchor is attached to the end of the string and is thrown overboard to deploy the decoy. If the reel is unbalanced the buoyant decoy will not float properly in the water, rendering the entire assembly useless to the hunter. Other known devices include reel mechanisms attached to the bottom of the decoy, with a weighted anchor suspended therefrom.

While these decoy systems may work satisfactory in some circumstances, there is a need for a simple anchor assembly that can be interchangeably secured to any decoy and that can retain the reel with the anchor line within the anchor housing. Often times, the anchor lines become entangled as the decoys are stored prior to and after deployment and retrieval from water. Untangling these lines is time-consuming. Since the hunters usually use more than one decoy, the time spent in untangling the anchor lines is multiplied by the number of decoys used by the hunter.

The present invention contemplates elimination of drawbacks associated with conventional decoys and provision of a waterfowl decoy anchor assembly that uses the anchor body for housing a reel with the anchor line and that can be stored separately from the decoy, thereby eliminating the danger of entangled lines.

SUMMARY OF THE INVENTION

It is, therefore, an object of the present invention to provide a waterfowl decoy assembly that houses a reel in an anchor body.

It is another object of the invention to provide a waterfowl decoy assembly that allows the anchor member to be detachably secured to the buoyant decoy member.

These and other objects of the invention are achieved through a provision of an anchor assembly for use with a buoyant decoy used in hunting has a hollow anchor housing configured for detachable engagement with the buoyant decoy, the hollow housing having an anchor head portion, a ballasted and ballastible anchor shaft portion and a hook portion unitary connected to the anchor shaft portion. A reel assembly with a spool of an anchor line is positioned in the anchor housing. The spool is rotated by a detachable crank handle to rewind the anchor line into the housing. A spring-operated release plunger is positioned within a bore formed in the head portion. When the plunger is depressed, the anchor line can be extended and/or retrieved. A hook on a free end of the anchor line allows detachable securing of the anchor housing to the keel of the decoy.

BRIEF DESCRIPTION OF THE DRAWINGS

Reference will now be made to the drawings, wherein like parts are designated by like numerals, and wherein.

DETAIL. DESCRIPTION OF THE INVENTION

Figure 1:
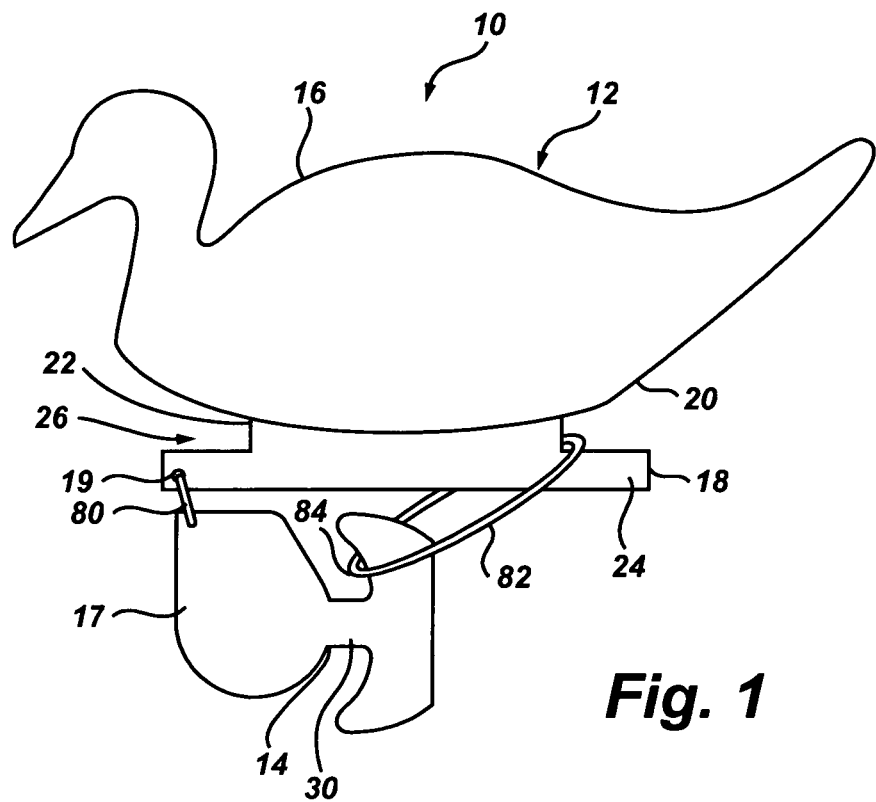
FIG. 1 is a perspective view of the decoy assembly according to the present invention.

Turning now to the drawings in more detail, the decoy and anchor assembly is designated by numeral 10. It should be noted that the decoy 12 does not form a part of the instant invention, and any conventional decoy 12 may be used in the instant invention. An anchor assembly 14 is configured for detachable attachment to a decoy member 12. In one aspect of the invention, the decoy member 12 is conventionally configured to resemble a waterfowl, for instance a duck. The conventional decoy member 12 comprises a buoyant floatable body 16 shaped as a duck and a decoy attachment member or keel 18 affixed to a bottom portion 20 of the decoy body 16.

The decoy attachment member or keel 18 comprises an upper part 22 and a lower part 24. The upper part 22 of the decoy attachment member 18 has smaller lateral dimension than the bottom portion 20 of the decoy body 16 and smaller than the lateral dimensions of the lower part 24. As can be seen in FIG. 1, a gap 26 is defined between the lower part 24 of the decoy attachment member 18 and the bottom portion 20 of the decoy body 18, the function of which in this invention will be explained in more detail hereinafter.

The anchor assembly 14 comprises a hollow anchor housing 15 having a hollow head portion 17, a ballastible and ballasted anchor shank portion 30 and a unitary formed hook portion. The hook portion comprises a pair of hooks 32, 34 extending on opposite sides of the shank portion 30 and having upwardly turned points 36, 38, respectively. The hooks 32 and 34 are configured to penetrate into the soil 40 in the bottom of a body of water 42 and hold the decoy assembly 10 in place against the forces of wind and/or current.

The hollow shank portion 30 and the hook portion 32 define an inner chamber 31, which is filled with a ballast medium, for instance weight pellets 41. The weight pellets 41 are adapted to increase the weight of the anchor member 14 and assist in retaining the decoy member 12 in a desired location in the body of water 42.

Figure 6:
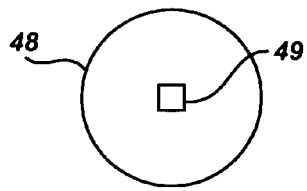
FIG. 6 is a top view of the spool of the assembly of the present invention.
Figure 7:
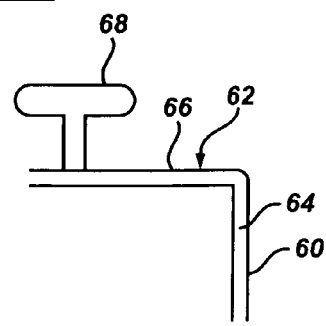
FIG. 7 is a detail view of the crank handle for the spool of the waterfowl decoy assembly of the present invention.

The hollow head portion 17 encloses and houses a reel assembly 46. The reel assembly 46 comprises a spool 48 carrying a pre-determined length of an anchor line 50, with the spool 48 rotatably mounted about its central axis on a spindle 52. A crank-receiving insert 49 is fitted into the spool 48. The insert 49 is a female insert configured for receiving one end 60 of a crank handle 62. In one aspect of the invention, the insert 49 has a square or rectangular cross-section, as shown in FIG. 6, and the end 60 of the crank shaft 62 is similarly configured to fit into the insert 49 and frictionally engage therein by having a corresponding size and shape. The crank handle 62 is configured for selective detachable engagement with the spool 48 when the user wants to rewind the anchor line on the spool 48.

The crank handle 62 has a first portion 64 with the end 60, a second portion 66 oriented at a right angle to the first portion 64, and a grasping portion 68 secured to a free end of the second portion 66. When the user needs to retrieve the anchor line 50 onto the spool 48, the user inserts the end 60 into the insert 49 and, gasping the grasping portion 68, rotates the crank handle 62. The rotational force is transmitted onto the spool 48, causing the spool 48 to rotate about the axis of the spindle 52 and wind the anchor line 50 on the spool 48.

The anchoring line 50 is fed out through a line-guiding slot 54 in the top of the anchor head 17. The anchor head 17 is provided with a means for selectively restricting extension of the anchor line 50 from the reel assembly 46, which comprises a release plunger 56 extending into a transverse bore 70 formed in the anchor head 14, with the transverse slot communicating with the guiding slot 54. The release plunger has a portion extending outwardly from the anchor head.

Figure 3:
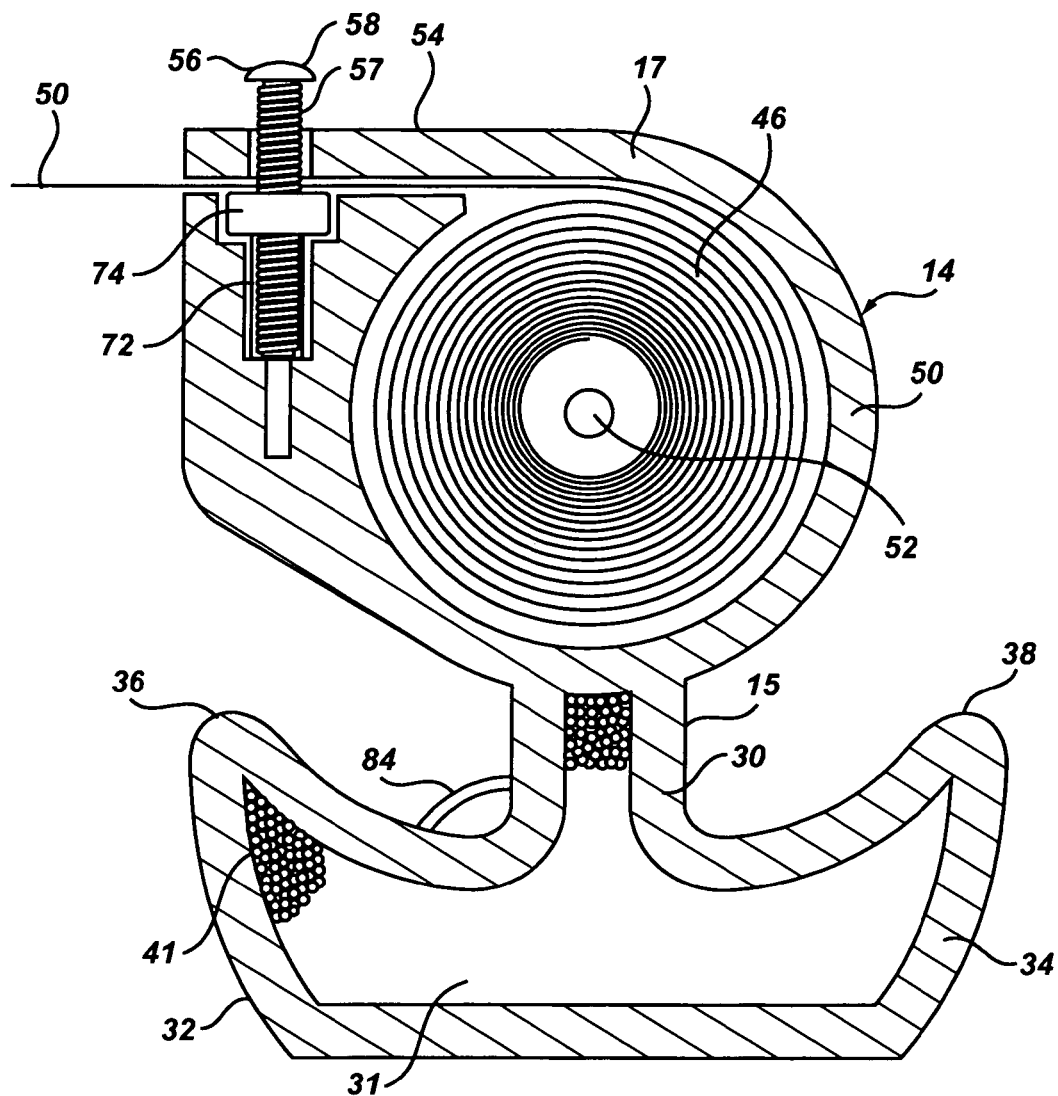
FIG. 3 is a partially sectional view of the anchor member of the assembly of the present invention.
Figure 4:
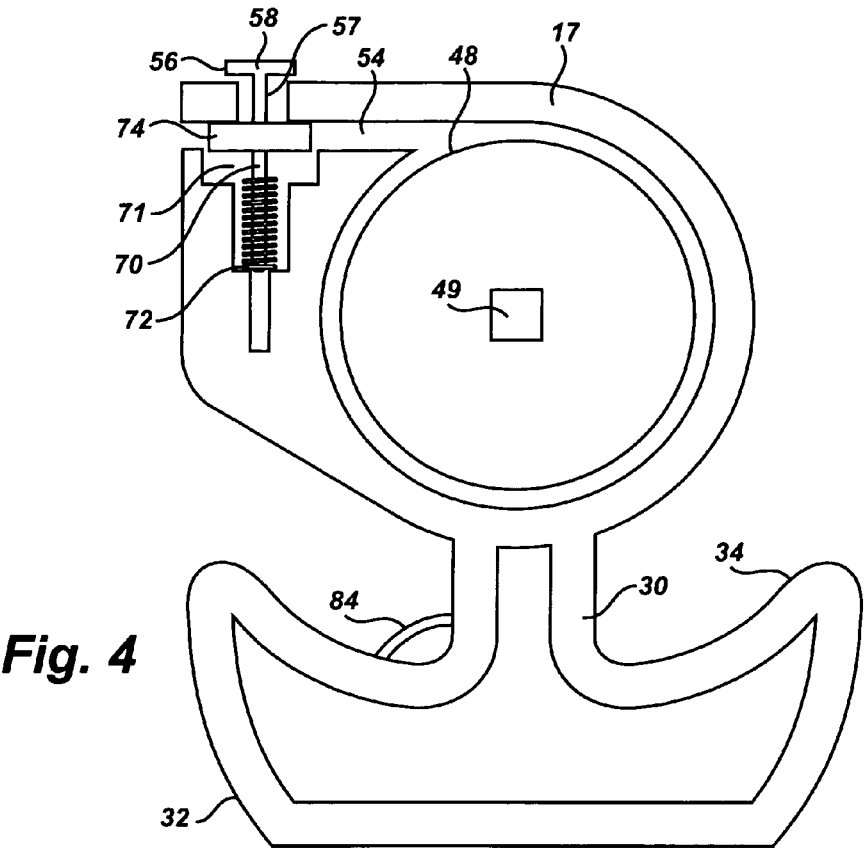
FIG. 4 illustrates position of the spool in the anchor body.
Figure 5:
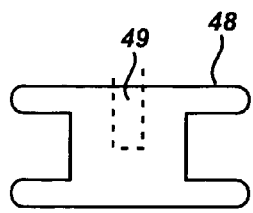
FIG. 5 is a detail side view of the spool of the assembly of the present invention.

The transverse bore 70 is formed transversely to the line-guiding slot 54 such that the longitudinal axis of the release plunger 56 extends transversely to the line of travel of the anchor line 50. A portion 57 of the release plunger 56 extends outwardly from the anchor head 17, and a knob 58 is secured on the end thereof. The knob 58 can be formed with a flat upper surface, as shown in FIG. 4, or a rounded upper surface, as shown in FIG. 3.

A compression spring 72 is mounted in the transverse bore 70 in a surrounding relationship over the release plunger 56. A circular washer 74 is fitted above the compression spring 72 in a frictional engagement with the release plunger 56. The washer moves within a transverse cutout 71 formed in an upper portion of the transverse bore 70. The compression spring 72 urges against the underside of the washer 74 forcing the washer 74 outwardly from the bore 70 into a contact with the anchor line 50, which passes through the guiding slot 54.

When a user pushes on the knob 58, the plunger 56 is forced inwardly into the transverse bore 70. The plunger carrying the washer 74 causes the washer 74 to move downwardly within the cutout 71. The frictional force on the line 50 is no longer applied, and the anchor line 50 can be paid out through the guiding slot 54 to a desired length.

In one aspect of the invention, a free end of the anchor line 50 is detachably securable to the bottom part 24 of the keel 18. A hook 80 (FIG. 1) can be used to temporary secure the decoy 12 to the anchor assembly 14. The hook 80 can be attached to a free end of the anchor line 50. The user can store the decoys separately from the anchor assembly 14 and connect them with the hook immediately prior to deployment in water. Similarly, after retrieving the decoys from the water, the user can easily unhook the decoys from the anchor assemblies 14 and store then separately to avoid the anchor lines entanglement.

In one aspect of the invention, the decoy 12 and the anchor 14 can be stored for long periods of time by attaching a simple attachment device, for instance a rubber band 82 to the back part 24 of the keel 18. A small bracket is secured between the anchor shaft 34 and the hook 32. The band 82 can be looped under the bracket 84, as shown in FIG. 1, thereby securing the decoy 12 and the anchor assembly 14 on a temporary basis for storage or travel.

Figure 9:
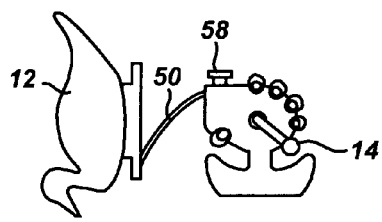
FIG. 9 illustrates a step in the method of deploying the decoy assembly requiring the user to press the release button.
Figure 14:
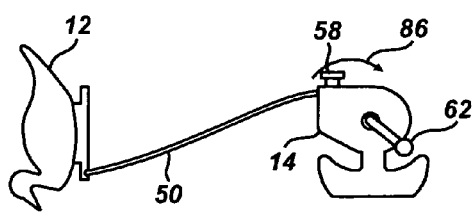
FIG. 14 illustrates the manner of winding the string on the reel when retrieving the decoy assembly.
Figure 12:
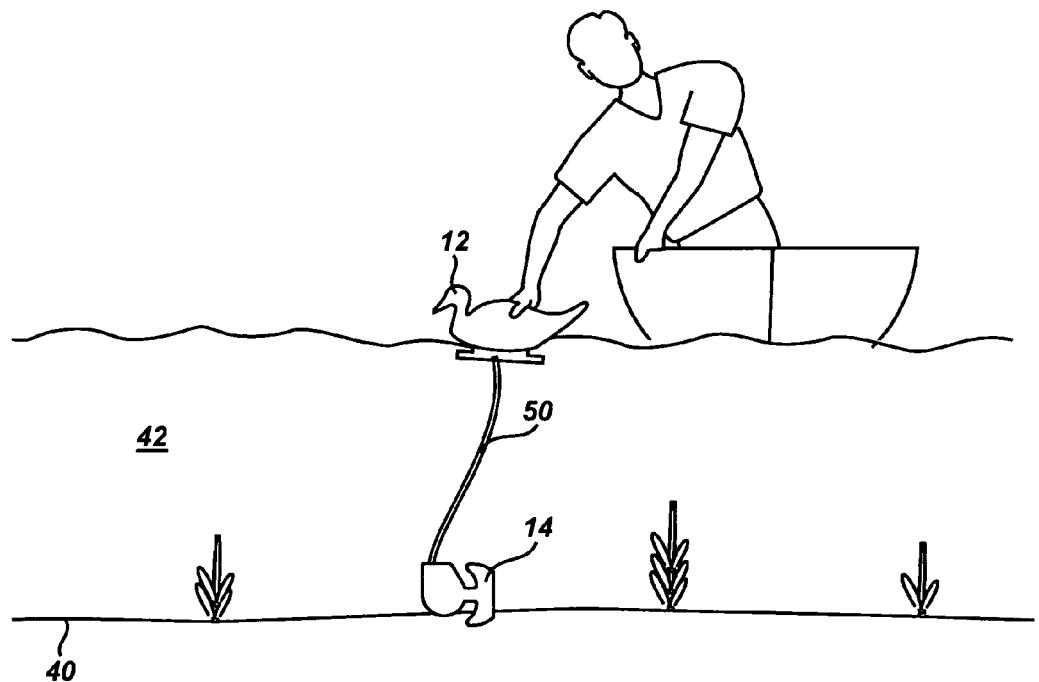
FIG. 12 illustrates a step in retrieving the decoy assembly from the body of water.
Figure 13:
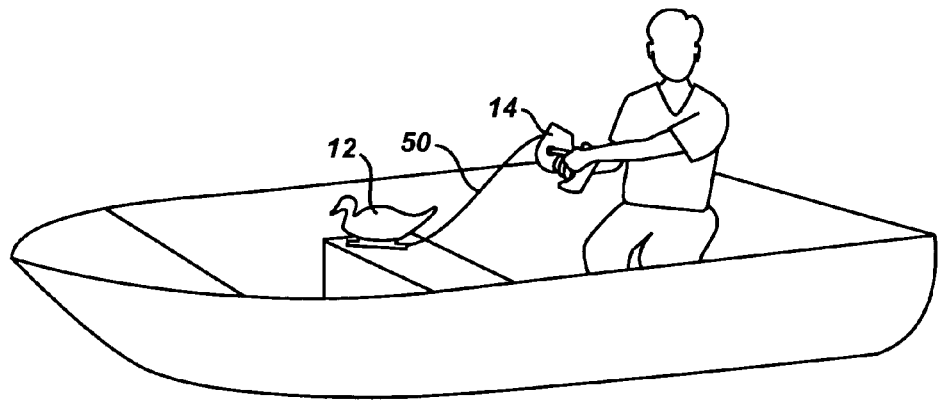
FIG. 13 illustrates a step in the process of retrieving the decoy assembly and reeling up the string.

The anchor assembly 14 can be secured to different positions on the keel 18. Some decoys have openings 19 for attachment to the anchor line formed in the front portion of the keel 18. Others may have the openings for the anchor line in the middle portion of the keel, as shown in the illustration of FIGS. 12 and 14. Still others may have openings in the back portions of the keel, as shown in FIGS. 9 and 13. Regardless of the location of the attachment opening 19, the anchor assembly 14 can be easily attached and detached using the temporary securing means such as the hook 80.

Figure 10:
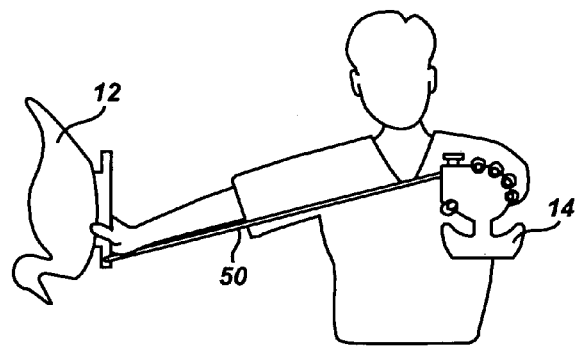
FIG. 10 illustrates another step in the process of deploying the decoy assembly requiring the user to extend the string from the reel mechanism.
Figure 11:
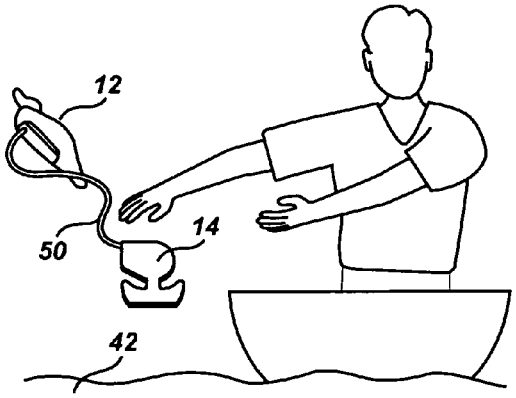
FIG. 11 illustrates the step of tossing the decoy assembly into the water for deployment in the body of water.

In operation, the user holds the anchor assembly 14 and presses on the knob 58 to extend a short length of the anchor line 50 from the spool 48 and then attaches the anchor line 50 to the decoy as, as shown in FIG. 9. The user then extends the anchor line 50, while holding the knob 58 pressed to a desired length, as shown in FIG. 10. Since many ponds have a depth of only a few feet, the hunter can anticipate the length of the anchor line that will be needed to keep the decoy 12 floating on the water surface without submerging in water. The user then tosses the anchor and the decoy into the water, as shown in FIG. 11, in a desired location to attract wild birds.

Figure 2:
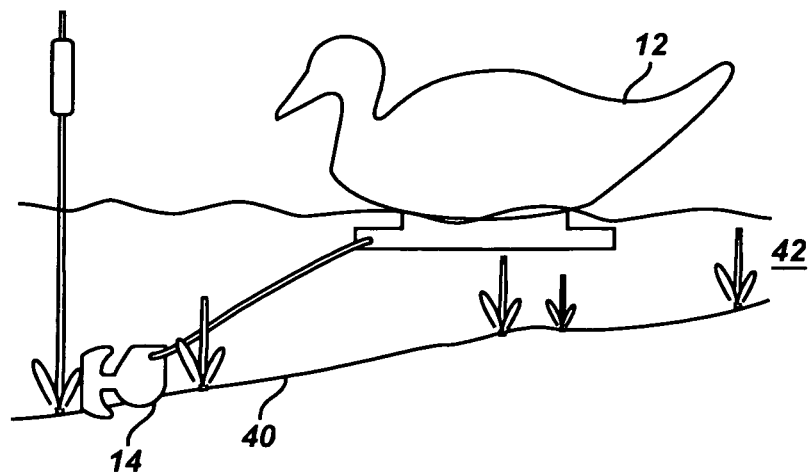
FIG. 2 is a perspective view of the decoy assembly of the instant invention deployed in a body of water.

The decoy 12 floats on the surface of the body of water 42, as shown in FIG. 2, while the anchor assembly 14 retains it in place. The anchor hook may penetrate into the water bed 40 to some degree or hold onto some vegetation in the pond. After the hunting is over, the user retrieves the decoy 12 by picking it up from water, as shown in FIG. 12 and positions the decoy 12 in the boat or any other desired location.

Figure 8:
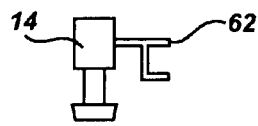
FIG. 8 is a detail view of the anchor reel of the assembly of this invention.

The user then attaches the crank handle 62 to the anchor reel, as shown in FIG. 8, and rewinds the anchor line 50 onto the spool 48 by rotating the crank handle 62 in a direction of arrow 86 (FIG. 14), while at the same time pressing the knob 58. Once the anchor line 50 is rewound on the spool 48, the user disengages the hook 80 from the keel 18, thereby allowing storage of the anchor assembly 14 separately from the decoy 12.

Of course, if desired, the attachment between the decoy 12 and the anchor assembly 14 can be made more permanent. Alternatively, the anchor assembly 14 and the decoy 12 can be stored together in one location. In that case, the band 82 can be used for attaching the decoy keel 18 to the anchor 14.

Many changes and modifications can be made in the design of the present invention without departing from the spirit thereof. I, therefore, pray that my rights to the present be limited only by the scope of the appended claims.

I claim:

1. An anchor assembly for use with a buoyant decoy having a buoyant body and a keel attached to a bottom of the buoyant body, the assembly comprising:

a hollow anchor housing configured for detachable engagement with the buoyant body, said hollow anchor housing comprising an anchor head portion, an anchor shank portion and a hook portion unitary connected to the anchor shank portion, said anchor head portion is provided with a means for selectively restricting extension of the anchor line from said anchor head portion; and a reel assembly retaining a pre-determined length of an anchor line, said reel assembly being positioned in the anchor head portion, said anchor head portion being provided with a guiding slot for extending the anchor line from interior of the anchor housing to exterior of the anchor housing, wherein said means for selectively restricting extension of the anchor line from said anchor head portion comprises a spring-loaded release plunger moveable within a transverse bore formed in the anchor head portion transversely to the guiding slot, said release plunger comprising a portion extending outwardly from the anchor head portion, and a washer mounted on said release plunger in the anchor head portion and a compression spring normally urging the washer into a frictional engagement with the anchor line.

2. An anchor assembly for use with a waterfowl decoy having a buoyant body and a keel attached to a bottom of the buoyant body, the assembly comprising:
- a hollow anchor housing configured for detachable engagement with the buoyant body, said hollow anchor housing comprising an anchor head portion, a ballastible anchor shank portion and a hook portion connected unitary to the anchor shank portion;
- a reel assembly retaining a pre-determined length of an anchor line, said reel assembly being positioned in the anchor head portion, said anchor head portion being provided with a guiding slot for extending the anchor line from interior of the anchor housing to exterior of the anchor housing; and
- a means for selectively restricting extension of the anchor line from the reel assembly, said means for selectively restricting extension of the anchor line from said anchor head portion comprises a spring-loaded release plunger moveable within a transverse bore formed in the anchor head portion transversely to the guiding slot, a washer mounted on said release plunger in the anchor head portion and a compression spring normally urging the washer into a frictional engagement with the anchor line.

3. The assembly of claim 2, wherein said release plunger comprises a portion extending outwardly from the head portion.

4. The assembly of claim 3, wherein said release plunger is provided with a knob secured to the outwardly extending portion of the release plunger.

5. A method of deploying a buoyant decoy in a body of water, said decoy having a buoyant body and a keel secured to a bottom of the buoyant body, the method comprising the steps:
- providing an anchor assembly comprising a hollow anchor housing configured for detachable engagement with the buoyant body, said hollow anchor housing comprising an anchor head portion, a ballasted anchor shank portion and a hook portion connected unitary to the anchor shank portion;
- providing a rotatable reel assembly retaining a pre-determined length of an anchor line, said reel assembly being positioned in the anchor head portion;
- providing a means for selectively detachably securing the anchor housing to the buoyant body;
- detachably securing the anchor housing to the buoyant body;
- extending a predetermined length of the anchor line from the reel assembly;
- restricting extension of the anchor line from said anchor head portion prior to positioning the buoyant body in the body of water comprising a step of providing a spring-loaded release plunger moveable within a transverse bore formed in the head portion between an extended position and a depressed position, providing a washer mounted on said release plunger in the head portion and a compression spring normally urging the washer into a frictional engagement with the anchor line; and positioning the buoyant body in the body of water, while allowing the anchor housing to submerge and rest on a bottom of the body of water.

6. The method of claim 5, further comprising a step of providing a guiding slot in the head portion and extending the anchor line from interior of the anchor housing to exterior of the anchor housing.

7. The method of claim 5, further comprising a step of depressing the plunger to thereby move the plunger out of engagement with the anchor line, thereby allowing the extension of the anchor line from the anchor head portion.

8. The method of claim 5, wherein said release plunger comprises a portion extending outwardly from the head portion and a knob mounted on the outwardly extending portion.

9. A method of deploying in and retrieving a buoyant decoy from, a body of water, said decoy having a buoyant body and a keel secured to a bottom of the buoyant body, the method comprising the steps:
- providing an anchor assembly comprising a hollow anchor housing configured for detachable engagement with the buoyant body, said hollow anchor housing comprising an anchor head portion, a ballasted anchor shaft portion and a hook portion connected unitary to the anchor shaft portion;
- providing a rotatable reel assembly retaining a pre-determined length of an anchor line, said reel assembly being positioned in the anchor head portion;
- providing a means for selectively detachably securing the anchor housing to the buoyant body;
- detachably securing the anchor housing to the buoyant body;
- extending a predetermined length of the anchor line from the reel assembly;
- positioning the buoyant body in the body of water, while allowing the anchor housing to submerge and rest on a bottom of the body of water;
- retrieving the buoyant decoy from the body of water after a pre-determined period of time; and
- rewinding the anchor line on the reel assembly, comprising a step of providing a spool with the anchor line wound thereon, said spool being adapted for rotational movement about a central spindle, providing a crank handle, engaging the crank handle with the spool and applying rotational force to the spindle thereby rewinding the anchor line.

10. The method of claim 9, wherein said spool is provided with an insert configured for receiving an end of the crank handle therein.

11. A method of deploying in and retrieving a buoyant decoy from, a body of water, said decoy having a buoyant body and a keel secured to a bottom of the buoyant body, the method comprising the steps:
- providing an anchor assembly comprising a hollow anchor housing configured for detachable engagement with the buoyant body, said hollow anchor housing comprising an anchor head portion, a ballasted anchor shaft portion and a hook portion unitary connected to the anchor shaft portion;
- providing a rotatable reel assembly retaining a pre-determined length of an anchor line, said reel assembly being positioned in the anchor head portion;
- providing a means for selectively detachably securing the anchor housing to the buoyant body;
- detachably securing the anchor housing to the buoyant body;

extending a predetermined length of the anchor line from the reel assembly;

restricting extension of the anchor line from said anchor head portion prior to positioning the buoyant body in the body of water comprising a step of providing a spring-loaded release plunger moveable within a transverse bore formed in the head portion between an extended position and a depressed position, providing a washer mounted on said release plunger in the head portion and a compression spring normally urging the washer into a frictional engagement with the anchor line;

positioning the buoyant body in the body of water, while allowing the anchor housing to submerge and rest on a bottom of the body of water;

retrieving the buoyant decoy from the body of water after a pre-determined period of time; and rewinding the anchor line on the reel assembly.

12. The method of claim 11, further comprising a step of providing a guiding slot in the head portion and extending the anchor line from interior of the anchor housing to exterior of the anchor housing.

13. The method of claim 11, further comprising a step of depressing the plunger to thereby move the plunger out of engagement with the anchor line, thereby allowing the extension of the anchor line from the anchor head portion.

\* \* \* \* \*